United States Patent [19]

Travis

[11] Patent Number: 5,132,839
[45] Date of Patent: Jul. 21, 1992

[54] THREE DIMENSIONAL DISPLAY DEVICE

[76] Inventor: Adrian R. L. Travis, Wrangaton House, Wrangaton, South Devon, England

[21] Appl. No.: 633,283

[22] Filed: Dec. 24, 1990

Related U.S. Application Data

[63] Continuation-in-part of Ser. No. 217,617, Jul. 11, 1988, abandoned.

Foreign Application Priority Data

Jul. 10, 1987 [GB] United Kingdom ............... 8716369

[51] Int. Cl.$^5$ .............................................. G02B 27/22
[52] U.S. Cl. .................................... 359/462; 359/463; 359/464
[58] Field of Search ............ 350/132, 131, 88, 91, 350/92, 167, 130, 392

[56] References Cited

U.S. PATENT DOCUMENTS

| | | | |
|---|---|---|---|
| 2,574,186 | 11/1951 | Mahler | 350/131 |
| 3,493,290 | 2/1970 | Traub | 350/174 |
| 3,663,085 | 3/1972 | Davis | 350/132 |
| 3,715,154 | 2/1973 | Bestenveiher | 350/132 |
| 3,959,580 | 5/1976 | Chocol et al. | 350/131 |
| 4,552,442 | 11/1985 | Street | 354/112 |
| 4,563,617 | 1/1986 | Davidson | 315/312 |
| 4,649,425 | 3/1987 | Pund | 358/88 |
| 4,717,949 | 1/1988 | Eichenlaub | 358/3 |
| 4,772,943 | 9/1988 | Nakagawa et al. | 358/88 |

FOREIGN PATENT DOCUMENTS

| | | |
|---|---|---|
| 0114406 | 3/1984 | European Pat. Off. . |
| 0151330 | 8/1985 | European Pat. Off. . |
| 0226115 | 6/1987 | European Pat. Off. . |
| 0262955 | 4/1988 | European Pat. Off. . |
| 3240158 | 6/1984 | Fed. Rep. of Germany ...... 350/132 |

OTHER PUBLICATIONS

"An Analysis of 3D Display Strategies", Thomas F. Budinger, SPIE vol. 507, pp. 52-58, 1984.
"True Three-Dimensional CRT Based Displays", Hodges and McAllister, Information Display, May 1987, pp. 18-22.
"Use of Lenses to Enhance Depth Perception", Lowell Noble, SPIE vol. 761, (1987) pp. 126-128.
"3D Television, Movies and Computers Without Glasses" Robert Collender, IEEE vol. CE-32, No. 1, Feb. 1986, pp. 556-561.
"The Stereoptiplexer", Robert Collender, Information Display Nov., Dec. 1967, pp. 27-31.
"An Autostereoscopic CRT Display," Homer Tilton, SPIE vol. 120, 1977, pp. 68-72.
"Autostereoscopic Displays-Past and Future" G. B. Kirby Meacham, SPIE vol. 624 (1986) pp. 90-101.

(List continued on next page.)

Primary Examiner—Jon W. Henry
Attorney, Agent, or Firm—David P. Gordon

[57] ABSTRACT

A display video apparatus which provides a three dimensional image broadly comprises a backlighting apparatus for projecting beams of light in selected directions, a spatial light modulator for displaying images back-lit by the back-lighting apparatus, and a control system coupled to both the spatial light modulator and the backlighting apparatus. The control system causes a plurality of images of an object to be formed in succession on the spatial light modulator with each image being a view of the subject from a different angle, and each image being viewable only from particular angles. The images are formed one at a time on the spatial light modulator with a plurality of images constituting a single frame of a video picture. The backlighting apparatus preferably includes a two dimensional display device for emitting spots of light at selected locations along the two dimensional display, and a lens system for refracting light emitted by the two dimensional display device. The lens system can comprise a single lens or an array of lenses located between the two dimensional display and the spatial light modulator. The lens or lens array refracts beams emanating from a spot of light on the two dimensional display into substantially parallel rays.

28 Claims, 5 Drawing Sheets

OTHER PUBLICATIONS

"3D TV Projection" Reinhard Börner, Electronics and Power, Jun. 1987, pp. 379-382.

"Collimated View Multiplexing: A New Approach to 3-D" Joel Kollin, SPIE vol. 902 (1988) pp. 24-30.

"Electronic Display System for Computational Holography" Pierre Hilaire et al. SPIE vol. 1212 (1990) pp. 174-182.

"Real-Time Display of 3-D Computed Halograms by Scanning the Image of an Acousto-Optic Modulator" Joel Kollin et al., to be published in the Proc. of the 2nd Int'l Congress of Optical Sciences & Engineering-1989.

"Real-Time Display of Computer Data Using Computer Generated Holograms"-Hamid Farheash et al., SPIE vol. 1052 (1989) pp. 172-176.

"Works on the Holographic Cinematography in the USSR" V. G. Komar et al., SPIE vol. 1183 (1989) pp. 170-182.

"Display & Analysis of Tomographic Volumetric Images Utilizing a Vari-Focal Mirror" L. D. Harris et al., SPIE vol. 507, (1984) pp. 38-45.

"High-Speed Interaction on a Vibrating Mirror 3D Display" Peter Mills et al., SPIE vol. 507 (1984) pp. 93-101.

"Display & Perception of 3-D Space-Filling Data" Gregory Russell et al., Applied Optics vol. 26, No. 6, Mar. 15, 1987, pp. 973-982.

"Display of Moving Volumetric Images" David Jansson et al., SPIE vol. 507 (1984) pp. 82-92.

"Full Color Stereoscopic Video Pickup & Display Technique Without Special Glasses" Susumu Ichinose et al. SID89 Digest, pp. 188-191.

"A Realtime Head Motion Detection System" Kenji Hase et al., SPIE vol. 1260 (1990) pp. 262-269.

"Field Sequential Stereoscopic Viewing Systems Using Passive Glasses" Philip Bas et al., Tektronix, Inc.

"Brightness Amplifying 3D TV Projection System with a Copper Laser" Kazuokuroda et al., SID88 Digest, pp. 95-98.

"A Dynamic Real Time 3-D Measurement Technique for IC Inspection" B. C. Breton Microelectric Eng. 5 (1986) pp. 541-545.

"Stereoscopic Displays: the Human Dual Visual System" Robert Clapp, SPIE vol. 624 (1986) pp. 41-52.

"Three Dimensional Display of Scientific Data" Lambertus Nesselnick et al., SPIE vol. 1501 (1989) pp. 169-170.

"Mental Image", IEEE Spectrum Innovations Section Dec. 1987.

"Spinning Screen TV Gives Real-3-D Images", New Scientist Aug. 11, 1990.

"Inventor Shows 3-D Television" by Fishlock, UK News.

"No Specs Please 3-D Videos Simply Brilliant", Daily Mail, Nov. 12, 1990.

"3D Vision of Big Rewards in a Different Dimension" by Chiltock, Financial Times Sep. 30, 1986.

"Art Illusion & the Visual System" by Livingstone Scientific American, Jan. 1988, vol. 258, No. 1, pp. 67-75.

"Using the Best: A Six-Dimensional Mouse for Object Placement" Ware et al., IEEE, Nov. 1988, pp. 65-70.

Contents of Processing and Display of Three-Dimensional Detail, vol. 507, 1984.

Contents of True Three-Dimensional Imaging Techniques and Display Technologies, vol. 761, 1987.

Contents of Three Dimensional Imaging and Remote Sensing Imaging, vol. 902, 1988.

Collquium Schedule held by Institution of Electrical Engineers on May 5, 1988.

First International Symposium on 3D Images-Articles Given-Paris, Sep. 26-28 1991.

THREE DIMENSIONAL DISPLAY DEVICE

This is a continuation-in-part of U.S. Ser. No. 07/217,617 filed Jul. 11, 1988 now abandoned.

BACKGROUND OF THE INVENTION

This invention relates to a three dimensional display apparatus. More particularly, this invention relates to a three dimensional video display, such as a television, where a three dimensional moving image is seen without visual aids.

Display apparatus are in common use, e.g. in television receivers, computer interfaces, instrumentation and visual display units. Generally these are two dimensional display apparatus, in that they display only a two-dimensional picture.

A variety of cues are present in the picture provided by a two dimensional display, which provide the observer with a perception of depth. Such cues include shadow, size, perspective and the obscuring of far objects by close ones. However, two of the most important depth cues which are used by human vision are missing in a conventional two dimensional display. These are the difference between the views seen by the two eyes, and the continuous change of view which an observer would expect if he were moving his head with respect to a true three dimensional image. These two cues are necessary if the observer is to be given a proper perception of three dimensions.

Various display systems have been made which require the user to wear spectacles so that different views of a scene are presented to each eye. These provide human vision with stereoscopic information, but not with the information or cue expected from movement of the head. Further, such spectacles are inconvenient to wear.

Some attempts have been made to construct three dimensional display apparatus which do not require the user to wear spectacles. In many of these apparatus the picture seen on the screen depends on the direction from which the screen is viewed. The picture seen on the screen is that which would be seen of the three dimensional image from the same direction of observation if the three dimensional image were present in place of the display apparatus. The image presented by these apparatus provides all of the information needed by human vision to perceive depth, and so is apparently three dimensional. Most of these apparatus have moving parts which make them expensive and delicate.

For a conventional display such as a television screen, a picture of an object is assembled from a two dimensional array of pixels. In a similar way a three dimensional image of an object might be assembled from a three dimensional array of pixels. However, such an apparatus would be complicated and expensive. Moreover, opaque objects could not be properly displayed, as a front object would not block out the emitted light used to depict a rear object, and hence, the rear object would be seen through the front one as an apparition.

Holograms are known to be able in principle to reproduce an image of any three dimensional object. Holograms work by providing a surface which modulates light as a function of both position and angle. Modulation of light as a function of position is what is provided by an ordinary video display. It is the additional ability to modulate light as a function of angle which is required for a three dimensional display. Thus, logically, it might be desirable to provide a display device which displays holograms. However, the resolution required to provide a hologram is determined by the wavelength of light. As a result, the video mosaic (i.e. pixel array) required to display a hologram must be extremely fine, and for large area display devices such as televisions, the cost of providing such resolution is prohibitive.

Another manner of modulating light as a function of position and angle is proposed by Meacham, G. B. K., "Autostereoscopic Displays—Past and Future", Proc SPIE Int. Soc. Opt. Eng. Vol. 624 Advances in Display Technology VI, pp. 90-101, 1986. Meacham proposes putting a spatial light modulator in front of a video display with a movable vertical slit being provided in front of each pixel. If the pixel is also shaped as a vertical line, then the relative positions of the pixel and slit will determine the direction from which rays may leave the spatial light modulator. The disadvantages of such a system are the requirement of moving parts as well as the fact that the resolution of the video display must be very fine.

SUMMARY OF THE INVENTION

It is therefore an object of the invention to provide a video display apparatus from which three dimensional images are seen without the aid of spectacles.

It is another object of the invention to provide a video display apparatus which utilizes a two dimensional pixel array but which modulates light as a function of position and angle to provide a three dimensional image.

It is a further object of the invention to provide an economically and technically practical video display apparatus which utilizes a two dimensional pixel array, but which provides a three dimensional image without the aid of spectacles.

It is yet another object of the invention to provide a video display apparatus which utilizes no moving parts and which provides a three dimensional image without the aid of spectacles.

It is even a further object of the invention to provide a video display apparatus which uses optical Fourier transforms to make a picture visible as a function of position and angle so as to provide a three dimensional image.

in accordance with the objects of the invention, a display video apparatus which provides a three dimensional image broadly comprises a backlighting means for projecting beams of light in selected directions, a spatial light modulator for displaying images back-lit by the back-lighting means, and a control system coupled to both the spatial light modulator and the backlighting means. The control system causes a plurality of images of an object to be formed in succession on the spatial light modulator with each image being a view of the subject from a different angle, and each image being viewable only from particular angles (preferably corresponding to the angles of the view). The images are formed one at a time on the spatial light modulator with a plurality of images constituting a single frame of a video picture The backlighting means preferably includes a two dimensional display device for emitting spots or vertical lines of light at selected locations along the two dimensional display, and a lens system for refracting light emitted by the two dimensional display device. The lens system is preferably a single lens located between the two dimensional display and the spatial light modulator. The lens refracts beams emanating from a spot of light on the two dimensional display into substantially parallel rays. Beams emanating from a vertical line of illumination on the two dimensional display are collimated in azimuth into rays with a substantially uniform azimuthal direction Alternatively, the lens system may comprise an array of lenses similarly located and serving a similar function.

In another embodiment of the invention, the back-lighting means comprises a coherent light source and a beam scanning means. In this embodiment, the lens system comprises a lenticular array and a second lens system. The lenticular array together with the coherent light source and beam scanning means form the equivalent of a two dimensional display device for emitting spots of light at selected locations. Thus, in accord with the preferred embodiment, the second lens system can comprise either the single lens or a second array of lenses located between the lenticular array and the spatial light modulator.

In yet another embodiment, the lens system includes a first lens located between the two dimensional display and the spatial light modulator, and a second lens located in front of the spatial light modulator for refracting beams of light passing through the spatial light modulator into substantially parallel rays. In this embodiment, the image is formed on the two dimensional display device (e.g. a CRT) which does not function as a back-lighting means. On the spatial light modulator is "formed" the Fourier transform of the image provided by the two dimensional display device. The second lens provides an inverse Fourier transform such that through the second lens is seen the CRT image. Making parts of the spatial light modulator opaque makes the CRT image invisible from certain directions. If the spatial light modulator is configured as a vertical slit, the CRT image becomes visible from a single direction in azimuth.

In all of the above-summarized embodiments, different views of a subject are projected in different directions (angles) from the apparatus, the different views corresponding to the different views of a three dimensional subject which would be seen from different directions. In other words, lateral multiplexing is utilized such that the two eyes of an observer see different views because each eye observes from a separate position, and the views seen by the observer change as he moves his head round the display However, instead of conventional lateral multiplexing, (such as might be used in holograms and lenticular screen displays) where several views are presented simultaneously, the invention further utilizes time multiplexing. Thus, the different views are presented in sequence while the position from which the display is visible is adjusted Provided the angle between the views is sufficiently fine and the sequence of views is repeated at sufficiently short intervals, the image displayed by the apparatus will appear smooth and three dimensional.

Additional objects, features, and advantages of the invention will become apparent to those skilled in the art upon reference to the following detailed description taken in conjunction with the accompanying drawings.

DETAILED DESCRIPTION OF THE PREFERRED EMBODIMENTS

Figure 1:
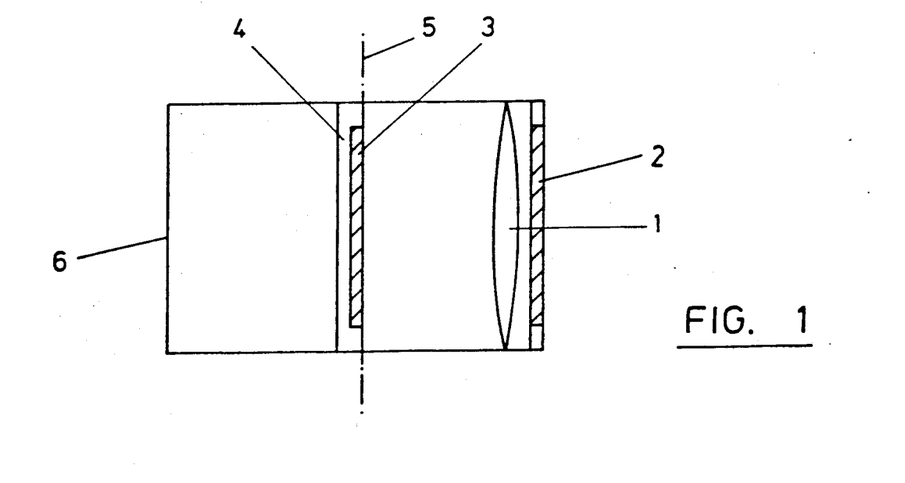
FIG. 1 is a diagrammatic section through the preferred three dimensional display apparatus in accordance with the invention.
Figure 2A:
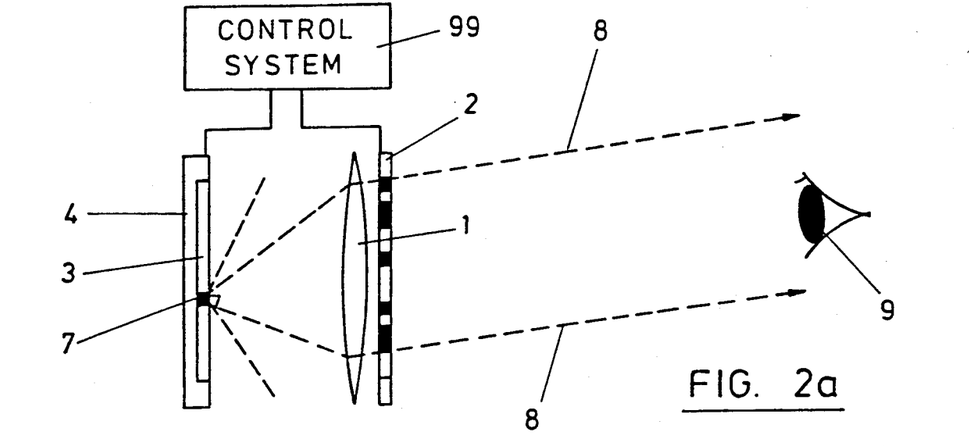
FIG. 2a is a ray diagram which demonstrates how a view is displayed by the apparatus of FIG. 1.

Referring to FIGS. 1 and 2a, an apparatus for providing a three dimensional dimensional video display comprises a lens 1, a spatial light modulator 2, a two dimensional display device 4 having a screen 3, and a control system 99. An opaque box 6 is preferably fitted around the rear and sides of the three dimensional video apparatus to exclude extraneous light. In the preferred embodiment of FIGS. 1 and 2a, the lens 1 is located substantially adjacent (e.g. face to face against) the spatial light modulator 2. The screen 3 of the two dimensional display device 4 is located in the focal plane 5 of the lens 1. In this manner, the two dimensional display device 4 and the lens 1 together comprise a back-lighting means for the spatial light modulator. The control system 99 is used to control both the spatial light modulator 2 and the two dimensional display device 4 to provide a three dimensional image as hereinafter described.

A spatial light modulator is a device whose optical transparency or optical reflectivity can be electronically controlled. Such devices can be divided into arrays in which the transparency or reflectivity of each element of the array can be individually controlled. Consequently they can be used to present a picture comprised of many pixels. An example of a referred spatial light modulator is a liquid crystal display (LCD).

The two dimensional display device 4 may comprise spot sources of light or vertical line sources of light. Among the possible types of two dimensional display devices 4 are cathode ray tubes, electroluminescent displays, arrays of light emitting diodes, spatial light modulators with background illumination, liquid crystal shutters arranged against a uniformly illuminated background, and screens illuminated by a scanned ray of light.

The two dimensional display device 4 is preferably not illuminated when the picture on the LCD is changing.

Among the possible types of lens 1 are lenses with spherical surfaces: lenticular arrays of many spherical or cylindrical lenses, Fresnel lenses and holographic optical elements.

With the provided apparatus of FIGS. 1 and 2a, a succession of two dimensional images (pictures) representing views of a three dimensional object from different angles (directions) are displayed by the spatial light modulator 2. Simultaneous to the display of the picture, a spot of light 7 is provided on the screen 3 of the two dimensional display device 4. When light from the spot 7 passes through the lens 1, it is converted into substantially parallel rays of light 8 whose direction depends on the position of the spot 7 in the screen 3 of the two dimensional display device 4. The position of the spot 7 is so controlled by the control system 99 that light passes through the spatial light modulator 2 only to that view point 9 (i.e. in the desired direction) from which the picture on the spatial light modulator 2 is supposed to be seen. The width of the spot 7 determines the arc of view points within which the picture is visible, as spot 7 is effectively comprised of numerous point sources each providing a plurality of substantially parallel rays; the substantially parallel rays of one point source being slightly angled to the substantially parallel rays of another point source of the same spot.

Because each two dimensional picture is displayed only in a specified direction, and the arc over which any picture may be seen is kept quite small (e.g. one degree for a television), the eyes of a viewer see different pictures; i.e. each eye sees from a slightly different angle. As a result, a three dimensional image is obtained. On the other hand, because many two dimensional pictures may be displayed, and a single viewer only sees two of those pictures, the viewer may be seeing pictures only a small fraction of the time. Thus, the rate at which pictures are displayed must be increased substantially over standard frame rates so that the intervening dark periods are not noticeable by the human eye. In other words, because the frame rate must be kept the same to avoid flicker, and because several pictures are used to constitute a single frame of a three dimensional image, the "picture rate" must be increased signficantly. However, this is very feasible given today's technology, as LCD's and two dimensional display devices which function at extremely high frequencies are known.

Figure 2B:
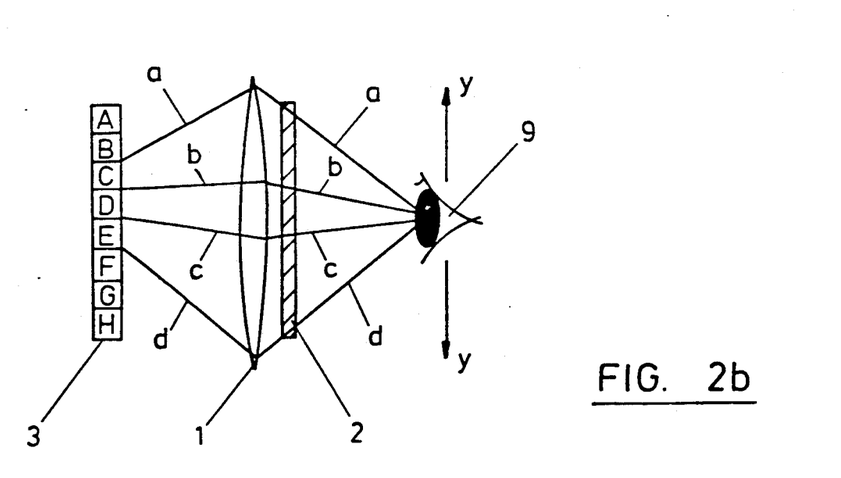
FIG. 2b is another ray diagram which is useful in explaining how the apparatus of FIG. 1 functions.

By way of additional explanation, reference is had to FIG. 2b where screen 3 is comprised of eight illuminators A, B, C, . . . H. It is a principle of optics that the source of any ray can be found via ray tracing. To find out what each eye of an oberver sees on a display, the rays reaching the observer's eye are reversed and tracked back through the optics to find the source. As shown in FIG. 2b, the eye 9 of an observer is placed close to the display. Four rays a, b, c, and d which reach the eye 9 are traced. Considering rays a and b, it will be appreciated that both rays originate (end up) from spot illuminator C. Other rays undrawn leave the eye in initial directions lying between rays a and b and pass through the LCD 2 at points between those through which rays a and b pass, and end up on spot illuminator C. Thus, with eye 9 located as shown in FIG. 2b, a slice of the LCD 2 lies on the ray paths between the eye 9 and illuminator C. Similarly, rays leaving the eye in initial direction lying between those of rays b and c will end up on illuminator D. So a different slice of the LCD 2 lies on the ray paths between the eye 9 and illuminator D. Finally, rays leaving the eye in initial directions lying between those of rays c and d will end up on illuminator E. Thus, the remainder of the LCD 2 lies on the ray paths between the eye 9 and illuminator E.

In actual operation, eight different pictures taken from eight different locations (angles) relative to a three dimensional scene are placed in sequence on the LCD to constitute a single motion picture frame. When the first picture is placed on the LCD, illuminator A is lit. When the second picture is placed on the LCD, illuminator B is lit; and so on. Given the arrangement of FIG. 2b, when illuminators A and B are lit, eye 9 will not see anything, as all rays leaving illuminators A and B and passing through lens 1 will not be received by eye 9. However, when illuminator C is lit, the eye 9 will see that slice of the LCD 2 lying between where rays a and b pass through the LCD. Similarly, when illuminators D and E are lit, different slices (portions) of the LCD will be seen by eye 9. For the position of the observer's eye 9 as shown in FIG. 2b, then, the observer will see a composite picture containing different slices of the third, fourth, and fifth pictures of the frame which are shown in rapid sequence. Of course, if the observer moves laterally along axis y—y, the rays of different illuminators will reach the observer's eyes, and hence different pictures will be seen.

If the observer moves closer or further from the display, different results occur. If the observer moves far from the display, using ray tracing, those skilled in the art will appreciate that the rays from the observer's eyes reaching the display will be substantially parallel (i.e. approximately collimated—or only slightly divergent). Because the illuminator 3 is in the focal plane of the lens, substantially prallel rays are all traced back to a single illuminator. Thus, in practice, if the observer is far from the display, only a single picture of the eight pictures used to constitute a single frame will be seen by the observer. Which particular picture seen is based on the angle at which the observer is located relative to the screen. Thus, if the different pictures placed on the LCD 2 are properly correlated to different view angles and to the lighting of the appropriate illuminator, the observer will receive an appropriate view from the single illumination.

If the observer of FIG. 2b, moves even closer to the LCD 2, the rays reaching the eye 9 will be even more divergent than shown. Thus, if the observer gets close enough to the LCD, the observer can see slices of all eight views with one eye. In such a situation, the rays reaching the observer's eye from the extreme right of the object are travelling in a substantially different direction to those reaching the observer's eye from the extreme left of the object. So the image formed in the observer's eye cannot be said to correspond to any one of the eight pictures formed. Instead, the right hand part of what the observer see will correspond to the right hand part of the eighth picture (as illuminated by illuminator H), and the left hand part of what the observer see will correspond to the left hand part of the first picture (as illuminated by illuminator A). Vertical slices of what the observer sees taken from intermediate areas will correspond to slices taken from the same areas of pictures two through seven as illuminated by illuminators B-G. This is essentially the same as what an observer of a real object sees.

As the observer's eye moves steadily back from the display the observer will see progressively wider slices of LCD 2 of progressively fewer pictures until at extreme distances only one view is seen. The significance of the change in numbers of slices with distance is that the perspective seen by the observer is changing with distance of the observer from the display.

Continuing with the observer far from the display, the observer can change the view that is seen on the LCD 2 by moving laterally (parallel to axis y—y of FIG. 2b). Lateral movements of the observer when closer to the display will have a similar effect except that slices will appear to track back and forth across the display as previously described (i.e. different slices, or different portions of different slices will be seen). When the observer is close enough that one eye can see slices of all eight pictures, no lateral movement is possible without part of the screen becoming blank. This is because no further views are available outside the arc covered by the cameras taking the original eight pictures It follows that the display provides best for lateral movements of the head when the observer is far from the display. The field of view over which lateral movement is possible when far from the display equals the angle subtended between extreme rays from illuminators A and H.

For desirable three dimensional viewing, stereopsis is required Thus, each eye of the observer should be provided with a different picture. As before, the display provides best for lateral movements of the head when the observer is far from the display. However, if the observer moves too far from the display, then stereopsis can break down. This is because at large distances the angle between adjacent views is greater than that subtended between the observer's two eyes from the display. There is therefore an ideal range of viewing distances over which the display provides well for lateral movements of the observer's head but also provides stereopsis.

Among the possible types of three dimensional images which might be displayed by a three dimensional display device are fully three dimensional images, partial three dimensional images, stereoscopic images, multiplexed images, images in parallax, and images in color. A fully three dimensional image provides numerous views as described above. A partial three dimensional image provides only some of the numerous views of the fully three dimensional image. A stereoscopic image is an image where only two views are presented; one for each eye of the observer. Production of the partial three dimensional and stereoscopic images therefore require less bandwidth than the production of a fully three dimensional image. With the stereoscopic image (and even the partial three dimensional image), it might be desirable to project the same views or sets of views to several different observers. This could be done by having not one but several spots 7 of light on the two dimensional display device 4 simultaneous to the display of each view on the spatial light modulator 2.

For a fully three dimensional image, the view must change when the observer moves his or her head both laterally and vertically. Change of view with vertical movement tends to be less important to the observer, however. A less than complete three dimensional image is therefore often satisfactory where the view only changes with lateral movement of the observer's head. Such an image is termed a parallax image, and only views from a single plane round the original object need be provided.

Color images can be provided for any of the three dimensional images. To obtain color, each view comprises a red, a blue and a green picture. The pictures may be presented in succession on the spatial light modulator 2 and the color of the light from the screen 3 of the two dimensional display device 4 varied as appropriate for the picture. Alternatively, colored filters may be placed over pixel positions on the spatial light modulator 2 and the two dimensional display device 4 made to emit white light. The three pictures are presented simultaneously on the spatial light modulator 2 so that the pixels of each picture are displayed at a pixel position covered in a filter of the appropriate color.

Figure 3:
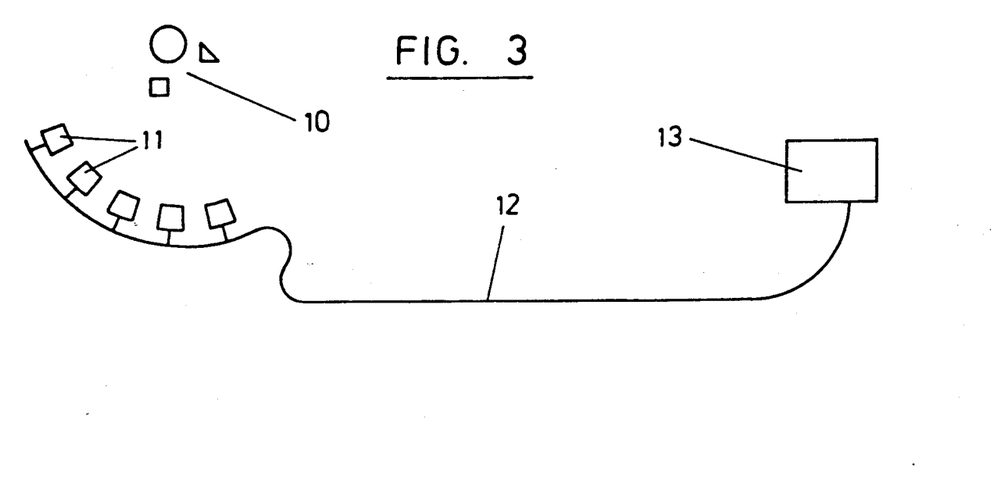
FIG. 3 is a diagrammatic plan of a dimensional display apparatus used in a three dimensional television system.

As shown in FIG. 3, the three dimensional display apparatus as described above with reference to FIGS. 1 and 2a may be used as the "screen" 13 for a three dimensional television system. The scene to be televised 10 is surrounded by a set of conventional television cameras 11. Each camera 11 records a view corresponding to the angle at which the camera is placed relative to the three dimensional scene. The pictures obtained by the cameras are then transmitted, e.g. via an optical fiber link 12, to the screen 13. Data compression techniques may be used to reduce the information transmission rate if required. Also, if desired, additional pictures can be generated via interpolation utilizing appropriate computer software packages. When appropriate editing has been completed, the recorded information as edited, enhanced, and/or compressed is transmitted via cable, satellite or other transmission media to three dimensional television sets of viewers.

Figure 4:
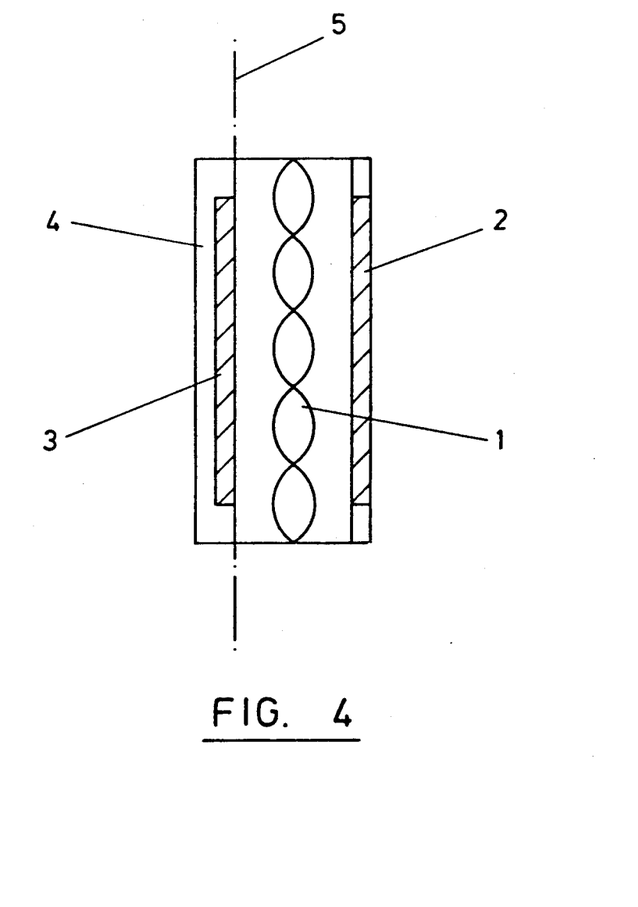
FIG. 4 is a diagrammatic section through a second embodiment of three dimensional display apparatus where the lens system comprises a lenticular array.
Figure 5:
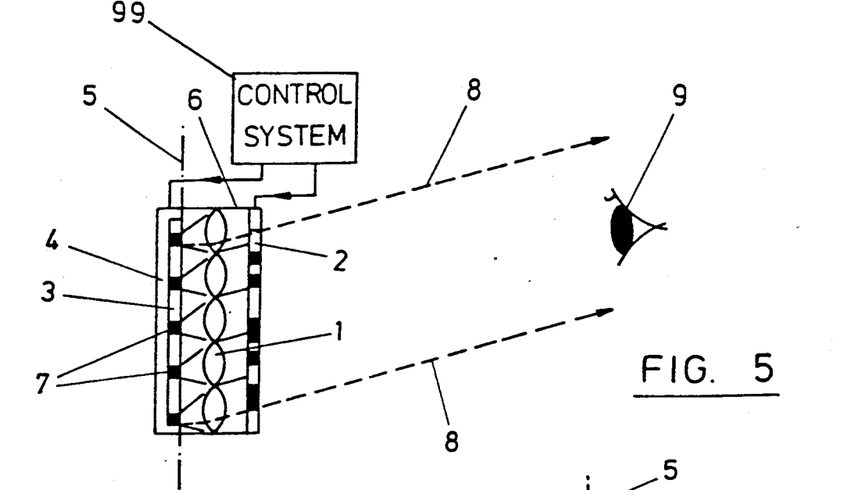
FIG. 5 is a ray diagram for the apparatus shown in FIG. 4.

Turning to FIGS. 4 and 5, a second embodiment is seen of the apparatus which produces a three dimensional image. The apparatus generally comprises a lenticular array 1, a spatial light modulator 2, a two dimensional display 4 having a screen 3, and a controller 99. The screen 3 is placed in the focal plane 5 of the lenses of the lenticular array. Because the lenses of the lenticular array are smaller than the lens of the single lens embodiment (FIGS. 1 and 2a), the focal plane 5 is located closer to the lenses. Thus, the thickness of the three dimensional display device of FIGS. 4 and 5 is signficantly smaller than that of the first embodiment.

With the apparatus of the second embodiment, a succession of pictures are displayed by the spatial light modulator 2 for each frame. Simultaneous to the display of a picture, spots 7 of light are displayed on the screen 3 of the two dimensional display device 4. When light from each spot 7 passes through the nearest lens of the lenticular array 1, it is converted into substantially parallel rays of light 8 whose direction depends on the position of the spot 7 in the screen 3 of the two dimensional display device 4. The positions of the spots 7 are so controlled that light passes through the spatial light modulator 2 only to that view point 9 from which the view on the spatial light modulator 2 is supposed to be seen. As with the embodiment of FIGS. 1 and 2, repetition of the display of each view must be repeated sufficiently quickly for the intervening dark periods not to be noticeable by the human eye.

Figure 6:
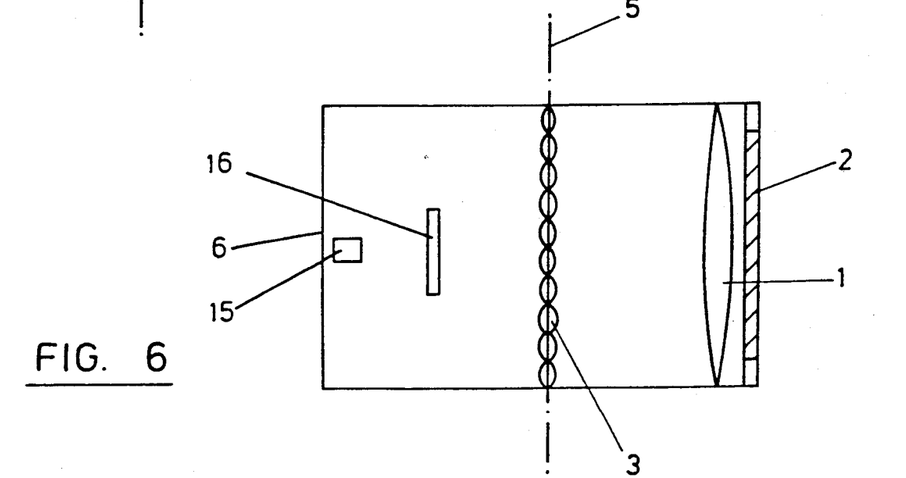
FIG. 6 is a diagrammatic section through a third embodiment of three dimensional visual display apparatus where the two dimensional device comprises a lenticular array scanned by a ray of coherent light.

Turning to FIG. 6, a third embodiment of the invention is shown. The apparatus of FIG. 6 is essentially equivalent to that of FIGS. 1 and 2a. The primary difference is that the backlighting arrangement is different. In FIG. 6 backlighting is accomplished by means of a laser 15, a beam scanner 16, and a lenticular array 3 which together effectively comprise a two dimensional display device. In particular, the laser 15 provides a coherent beam of light. The light generated by the laser 15 is directed toward the beam scanner 16 which is a device that directs coherent light in desired directions, thus effectively controlling the position to which the coherent ray of light travels. The directed light is directed by the beam scanner 16 to a selected lens in the lenticular array 3 from which light must be emitted if the view is to be seen only from an appropriate viewpoint. The lens of the lenticular array defocuses the ray so that it emits light just as the spot 7 of FIGS. 1 and 2a, with the exception that, in this third embodiment, the spot of light from the lens is coherent and so holograms can be recorded. With particular lenses of the lenticular array 3 providing spots of light, it will be appreciated that laser 15, beam scanner 16, and lenticular array together form a two dimensional display device. The lenticular array 3 is effectively the screen of that device.

With the provided two dimensional display device of FIG. 6, it will be appreciated by those skilled in the art that either of the lens and spatial light modulator systems of FIGS. 1 and 2a or 4 and 5 can be utilized to effect the three dimensional apparatus. As shown in FIG. 6, the arrangement of the first embodiment (FIGS. 1 and 2a) is preferred where a single lens 1 is provided and located nearly adjacent the spatial light modulator 2. The lenticular array 3 is located in the focal plane 5 of lens 1. A so, in accord with the previous embodiments, it will be appreciated that control of the spatial light modulator 2 is coordinated with the beam scanner 16 control by a system controller (not shown) so that desired pictures are provided on the spatial light modulator when a beam directed by beam scanner 16 causes particular spots to be generated on lenticular array 3.

A basic three dimensional display apparatus in accordance with the embodiment of FIGS. 1 and 2a may comprise a cathode ray tube for the two dimensional display device and a liquid crystal display (LCD) for the spatial light modulator. As aforedescribed, the cathode ray tube is positioned in the focal plane of the lens so that the spot of light emitted at any instant by the cathode ray tube is collimated into substantially parallel beams which backlight the picture on the LCD and project the picture in one direction only. With such an arrangement, the action of the lens is described mathematically as a Fourier transform with the plane on which the spots are located being called (by convention) the "Fourier plane", and the plane in which the image is formed being called the "spatial plane". The spatial distribution of amplitude as light passes through one focal plane of a lens is the Fourier transform of the spatial distribution of amplitude as light passes through the other focal plane of the lens.

In the aforedescribed embodiments, the CRT is typically moving one spot (or at most a few spots) of light while the LCD may have to change its entire display for each view. With present technology, the rate at which pictures can be formed on a cathode ray tube is greater than the rate at which pictures can be formed on LCDs. As a result, it would be advantageous to switch the functions of the CRT and the LCD. Such a switch is accomplished by the alternative embodiment of FIG. 7.

Figure 7:
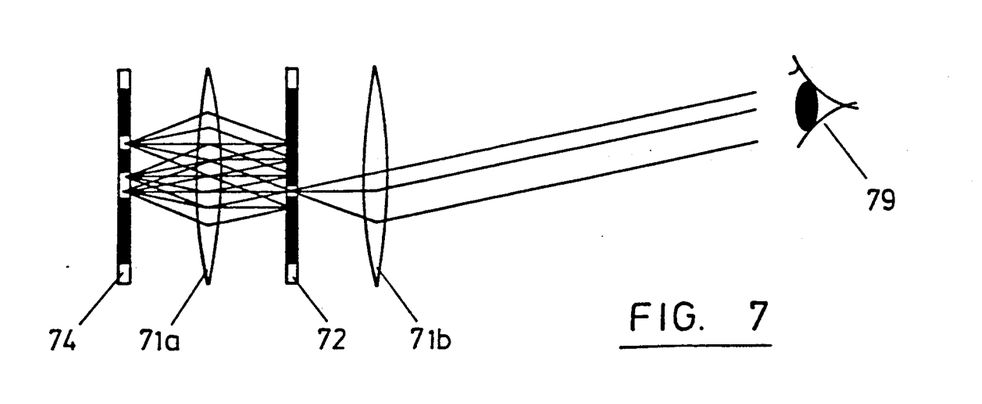
FIG. 7, is a diagrammatic section through an embodiment of a three dimensional display apparatus using a cathode ray tube to provide images and a liquid crystal display to determine the direction in which each image is viewed.

In FIG. 7, the three dimensional display apparatus is comprised of a CRT 74, an LCD 72, a lens system having lenses 71a and 71b, and a controller (not shown). Lens 71a is positioned between the CRT 74 and the LCD 72, with the CRT in one focal plane of lens 71a and the LCD in the other focal plane of the lens 71a, while lens 71b is positioned in front of the LCD 72 with the LCD 72 being in the focal plane of lens 71b. With such an arrangement, the first lens 71a images the Fourier transform of the image on the CRT onto the LCD. The second lens also performs a (inverse) Fourier transform, thereby effectively reproducing the original picture on the second lens 71b. A single spot is made transparent on the LCD 72, with the remainder of the LCD being left opaque. Because the LCD is in the Fourier transform plane, its effect is to control the position 79 from which the CRT image is visible. Since only a single spot is transparent on the LCD 72, the CRT image becomes visible from only a single viewing position 79.

Effectively, then, with the embodiment of FIG. 7, the CRT 74 is in the spatial plane, while the LCD 72 is in the Fourier plane; this being the opposite of the previously described embodiments. A second spatial plane, forward of lens 71b is also formed.

Figure 8A:
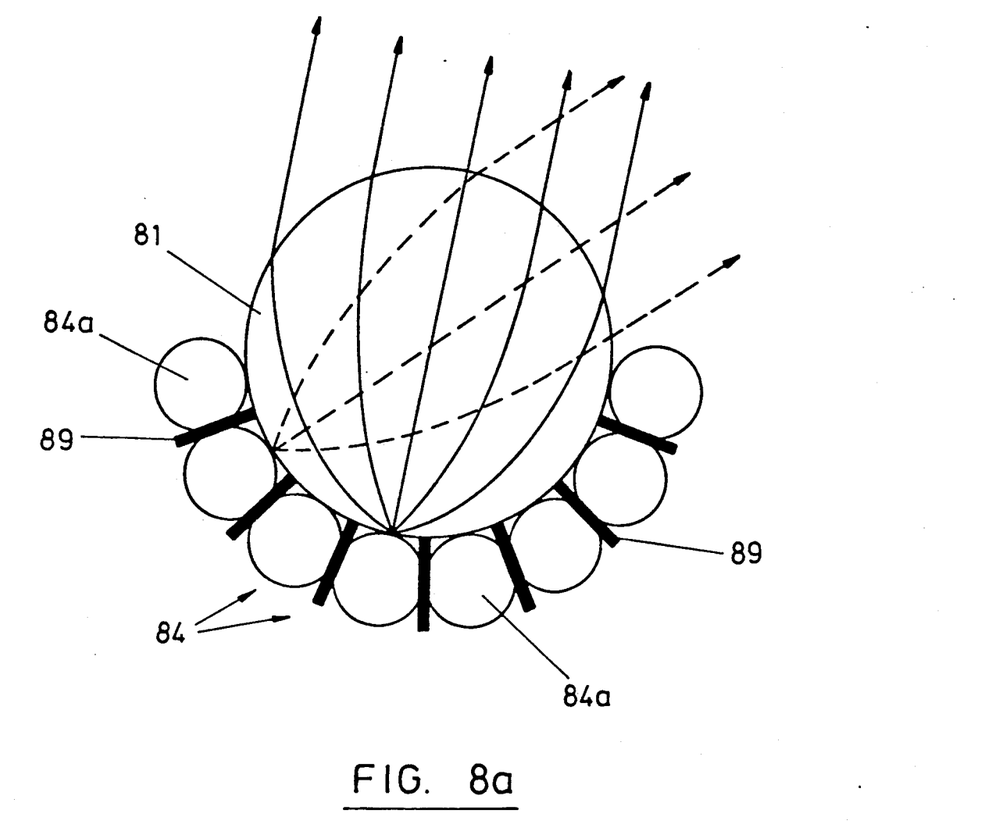
FIG. 8a is a diagrammatic section through an embodiment of a backlighting means which utilizes a graded index lens.

Turning to FIG. 8a, yet another backlighting means is shown. In FIG. 8a, a lens 81 is provided which is a cylinder of glass which is axially symmetric, but which has a refractive index that varies with radial distance from the center of the cylinder. In order to use the lens to create backlighting means, a two dimensional display device 84 is configured in a curve so as to fit around approximately one half of the cylindrical lens 81. The elements 84a of the two dimensional display device are configured as lines running the length of the cylinder and may be comprised of lossy optical fiber. Between each element 84a, is an opaque barrier 89.

As aforementioned, the cylindrical lens 81 has a refractive index that varies. The way in which the refractive index varies with radial distance from the center of the lens cylinder is set so that light from an element 84a in the two dimensional display device is refracted into a beam which is perfectly collimated in azimuth. The precise variation of refractive index with radial distance required to do this is calculated using a mathematical analysis disclosed by P. L. Chu, "Nondestructive Measurement of Index Profile of an Optical-Fibre Preform," *Electron. Lett.* 13, pp. 736-738 (1977), which analysis has been developed by others known in the art. Once the radial characteristics of the lens have been set so that it collimates light from any one element of the two dimensional display, then the lens will collimate light from any other element into a different direction, as will be understood by those skilled in the art.

Figure 8B:
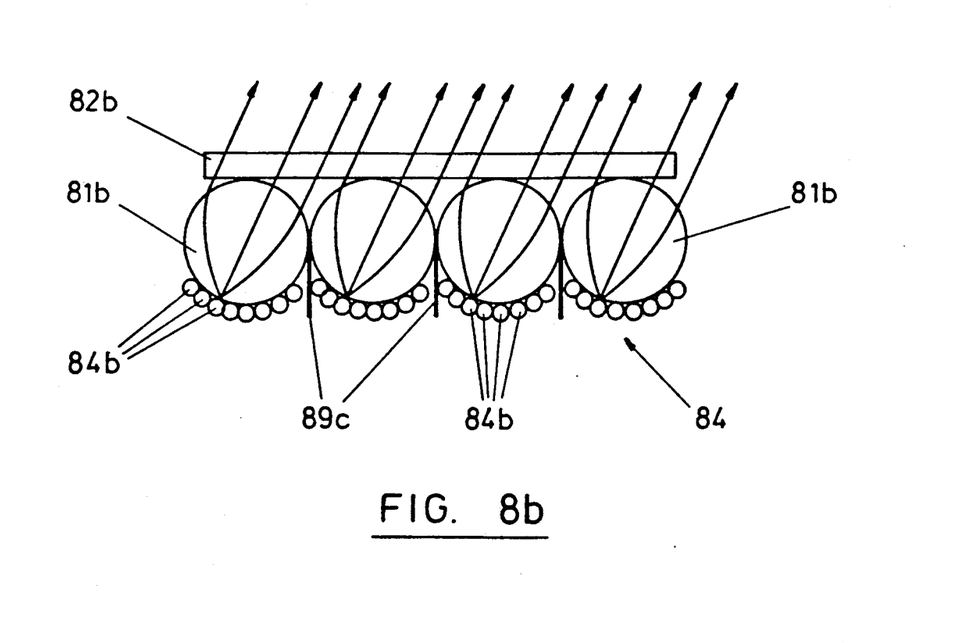
FIG. 8b is a diagrammatic section through a fourth embodiment of a three dimensional display apparatus which utilizes graded index lenses as backlighting means.

In order to reduce the depth of the display device, a plurality of graded index lenses may be utilized as shown in FIG. 8b. As seen in FIG. 8b, a three dimensional display apparatus is comprised of an LCD 82b, a plurality of graded index lenses 81b placed side by side, and a two dimensional display device 84 having elements 84b. Each graded index lens 81b with accompanying illuminating elements 84b are substantially as shown in FIG. 8a, except that the index lenses 81b are substantially smaller in diameter than lens 81, and the optical fibers 84b do not necessary fit around half of the lens, although they could. Also, between the rear half of each graded index lens 81b is another opaque barrier 89c which prevents stray rays of light from passing out of one lens and into an adjacent lens. While the barriers between the optical fibers themselves are not shown in FIG. 8b, they are preferably maintained.

As aforedescribed, the illuminating elements 84b are preferably lossy optical fibers. Light injected into a lossy optical fiber is scattered along the length of the optical fiber so that the whole optical fiber glows. Because the display device of FIG. 8b utilizes several graded index lenses, and optical fiber is laid along the back of each lens, to provide backlighting in any given direction from the whole aray of lenses, light will have to be injected into corresponding fibers behind each lens. A simple manner of accomplishing this is to link up related fibers such that light may be injected into a single fiber which is subsequently divided. Also, because half of the light emitted from the lossy optical fibers will be emitted to the rear of the fibers instead of into the lenses, the fibers are preferably wrapped round their rear halves with reflectors which will return the light for entry into the lenses.

Figure 9A:
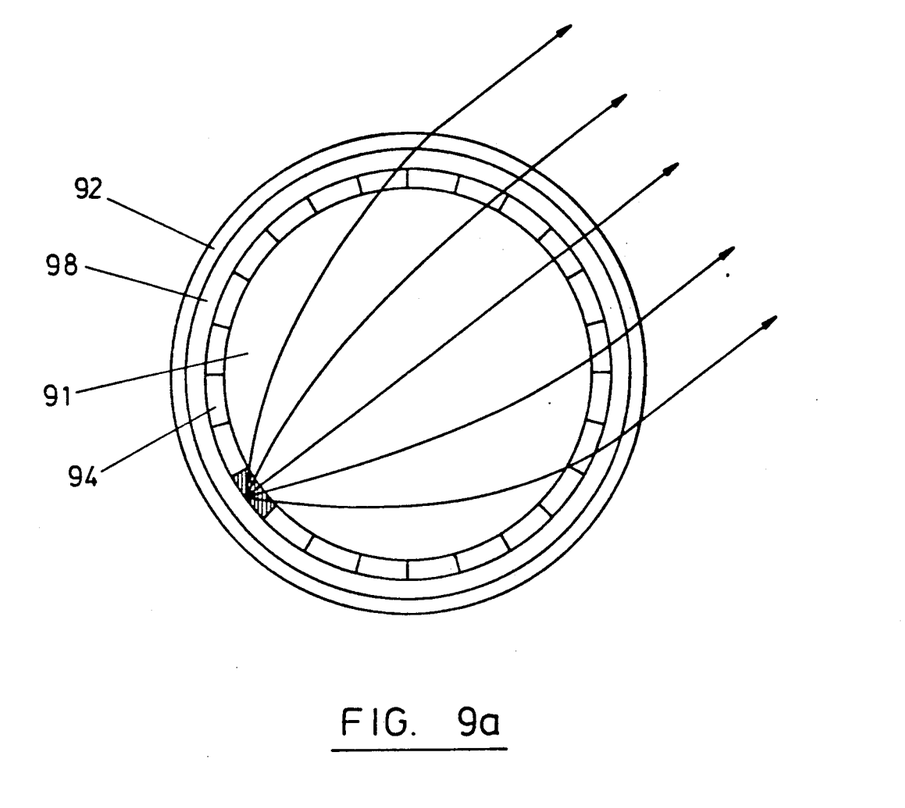
FIGS. 9a and 9b are dorsal and ventral views respectively of a three dimensional visual display apparatus providing allround viewing.
Figure 9B:
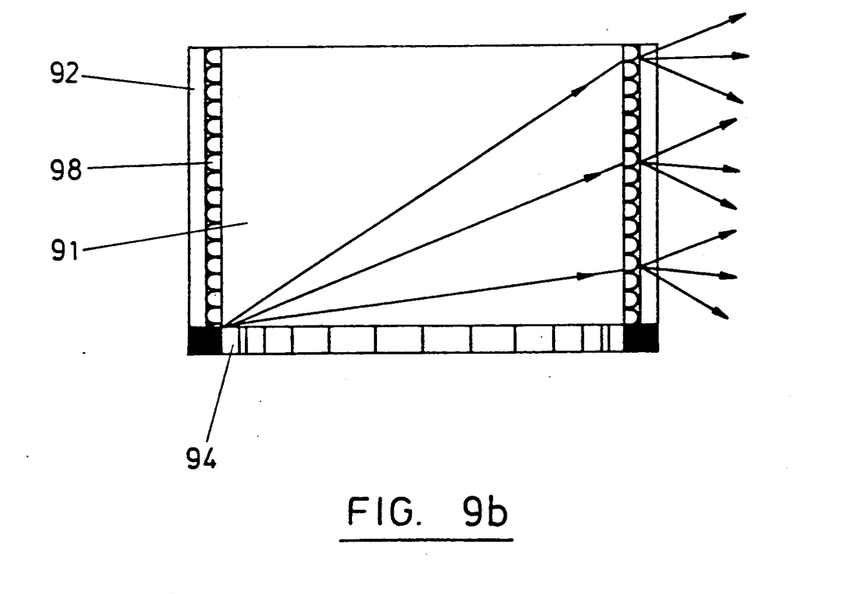

Turning to FIGS. 9a and 9b, a top (dorsal) view and a side (ventral) view of yet another three dimensional display apparatus according to the invention are seen. The apparatus of FIGS. 9a and 9b, however, is an apparatus for all around viewing; i.e. it is cylindrical and three dimensional views may be obtained at any location around the cylinder. As shown, the three dimensional display apparatus includes a spatial light modulator 92 on the outside of the cylinder which is implemented as a cylindrical LCD made out of rigid glass cylinders or flexible transparent sheets wrapped into a cylinder, and a backlighting means located inside the cylinder. The backlighting means preferably includes a single graded index lens 91, a two dimensional display of light emitters 94 preferably wrapped in a circle around the base of the graded index lens 91, and a sheet of lenticules 98 which scatter light in elevation but maintain the direction of light in aximuth. The lenticular sheet is wrapped around the graded index lens 91 and sits between the lens 91 and the LCD 92.

With the provided cylindrical apparatus of FIGS. 9a and 9b, light from an element 94 shines up into the graded index lens 91. As the light escapes the peripheries of the lens, it is scattered by the lenticular sheet so that the LCD 92 is illuminated in such a way as to be visible over all angles in elevation. Light from a single element is substantially collimated in azimuth by the refractive index gradations of the graded index lens 91. The LCD 92 is therefore illuminated by rays which are substantially collimated in azimuth. Thus, a single picture can be put upon a half of the LCD and will become visible over a narrow angle of positions. To obtain dimensional all round viewing, successive views are put up on the LCD as successive elements of the two dimensional display are illuminated.

There have been described and illustrated herein video display apparatus for providing three dimensional images. While particular embodiments have been described, it is not intended that the invention be limited thereto, as it is intended that the invention be as broad in scope as the art will allow. Thus, while several different backlighting means for projecting a beam of light in selected directions were disclosed, it will be appreciated that other such means would be available to those skilled in the art. For example, a parallel illuminator such as a large area laser, or a laser directed into a hologram, which emits parallel rays of light in a single direction over a large area could be used in conjunction with a large area beam scanner which would direct the large area of parallel rays in a substantially uniform direction to provide backlighting means. Further, while the invention was described as providing three dimensional images, the three dimensionality was primarily related to azimuthal views; i.e. as the viewer moved laterally, different views are seen. However, the apparatus of the invention are easily extended to providing different elevational views such that the viewer could gain different perspectives based on vertical locations Of course, by providing three dimensionality for both azimuthal and elevational views, yet higher LCD speeds are required, as the overall frame rate of the video must be maintained to prevent flicker. Also, while particular numbers of illuminating elements were described with reference to particular embodiments, those skilled in the art will recognize that other numbers of elements could be used and would typically depend upon the number of cameras initially utilized to obtain the pictures (although via use of computers, the number of cameras and illuminating elements need not necessarily coincide).

Further changes which would be evident to those skilled in the art might include the use of barriers running between each lens of the lens array to the two dimensional display in the embodiment of FIGS. 4 and 5. Also, it will be appreciated that while the screen of the two dimensional display was disclosed as being in the focal plane of the lenses of the various embodiments, it is possible to locate the screen at different locations. For example, for a computer work station where the display is at a distance of approximately one meter from the observer, it would he advantageous to provide an optimal viewing distance of approximately one meter (i.e. each eye sees a different single view at that distance). To accomplish the same, the two dimensional display should be moved back from the lens (as opposed to what is shown in FIGS. 2a and 2b). With such an arrangement, if the observer moves closer to the display, slices of several views will be seen. Likewise, if the observer moves further from the display, eventually slices in reverse order will be seen, as the rays are not substantially parallel. Of course, means for varying the distance of the two dimensional display relative to the lens could be utilized to permit proper focusing. Therefore, it will be appreciated by those skilled in the art that yet other modifications could be made to the provided invention without deviating from its spirit and scope as so claimed.

I claim:

1. A three dimensional display apparatus for displaying a subject in a motion picture, said motion picture having a plurality of frames, comprising:
   a) back-lighting means for projecting a beam of light in selected directions;
   a spatial light modulator for displaying images, said back-lighting means acting as a back-light for said spatial light modulator; and
   c) a control system coupled to and controlling said back-lighting means and coupled to and controlling said spatial light modulator for causing a plurality of different images of said subject to be formed in succession on said spatial light modulator, each different image being a view of said subject from a different angle, each different image being formed one at a time on said spatial light modulator, with the plurality of images constituting a single frame of sad motion picture, and the direction of said beam of light being different for each of said plurality of different images.

2. A three dimensional display apparatus according to claim 1, wherein:

said back-lighting means comprises a two dimensional display device for emitting a spot or a vertical line of light at selected locations of said two dimensional display device, and a lens system for refracting light emitted by said two dimensional display device to form said beam of light which is projected in selected directions, wherein the direction in which said beam of light is projected is dependent on the selected location of said spot or vertical line of light.

3. A three dimensional display apparatus according to claim 1, wherein:
said plurality of different images comprises at least three different images.

4. A three dimensional display apparatus according to claim 2, wherein:
said plurality of different images comprises at least three different images.

5. A three dimensional display apparatus according to claim 1, wherein:
said spatial light modulator is a liquid crystal display.

6. A three dimensional display apparatus according to claim 4, wherein:
said spatial light modulator is a liquid crystal display.

7. A three dimensional display apparatus according to claim 2, wherein:
said two dimensional display device emits spots or lines of red, blue, and green light at different times from substantially identical locations.

8. A three dimensional display apparatus according to claim 2, wherein:
said two dimensional display device emits spots or lines of white light, and said spatial light modulator further comprises a plurality of colored filters.

9. A three dimensional display apparatus according to claim 1, wherein:
said back-lighting means comprises a two dimensional display device for emitting spots or lines of light at selected locations of said two dimensional display device, and a lens system which comprises a plurality of lenses in a lenticular array, and
said control system controls said two dimensional display to emit light from a plurality of spots or lines corresponding to the respective lens of said lenticular array such that a corresponding plurality of beams of light emerge from said lenticular array in a substantially common direction for each image provided on said spatial light modulator.

10. A three dimensional display apparatus according to claim 9, wherein:
said plurality of different images comprises at least three different images.

11. A three dimensional display apparatus according to claim 9, wherein:
said spatial light modulator is a liquid crystal display.

12. A three dimensional display apparatus according to claim 1, wherein:
said back-lighting means comprises a light source, a beam scanning means, and a plurality of lenses in a lenticular array, wherein said beam scanning means is disposed between said light source and said plurality of lenses and directs light provided by said light source to particular of said plurality of lenses, and said plurality of lenses of said lenticular array are disposed behind said spatial light modulator.

13. A three dimensional display apparatus according to claim 12, wherein:
said plurality of different images comprises at least three different images.

14. A three dimensional display apparatus according to claim 12, wherein:
said spatial light modulator is a liquid crystal display, and said light source is a laser.

15. A three dimensional display apparatus according to claim 1, wherein:
each image of said plurality of different images is visible from a different direction, each different direction corresponding to the direction from which the subject had been viewed in obtaining that image.

16. A three dimensional display apparatus for displaying a subject in a motion picture, said motion picture having a plurality of frames, the apparatus comprising:
a) a two dimensional display device for displaying a succession of images;
b) a spatial light modulator which is rendered light transmissive at a plurality of selected locations;
c) a lens system for refracting each of said succession of images displayed on said two dimensional display device and rendering each image visible from a direction dependent upon the location at which said spatial light modulator is rendered light transmissive; and
d) a control system coupled to and controlling said two dimensional display device for causing said succession of images to be displayed thereon, and coupled to and controlling said spatial light modulator for rendering said spatial light modulator light transmissive at a different one of said plurality of selected locations for each image of said succession of images, wherein,
each image of said succession of images is a view of a three dimensional subject from a different angle,
each image is formed one at a time on said two dimensional display device, with a plurality of images in said succession of images constituting a single frame of said motion picture.

17. A three dimensional display apparatus according to claim 16, wherein:
each image of said plurality of succession of images is visible from a different direction, each different direction corresponding to the direction from which the subject had been viewed in obtaining that image.

18. A three dimensional display apparatus according to claim 17, wherein:
said lens system comprises a first lens positioned between said two dimensional display device and said spatial light modulator, with said two dimensional display device being in the focal plane of said first lens, and a second lens positioned in front of said spatial light modulator, with said spatial light modulator being in the focal plane of said second lens.

19. A three dimensional display apparatus according to claim 18, wherein:
said plurality of different images comprises at least three different images.

20. A three dimensional display apparatus according to claim 18, wherein:
said spatial light modulator is a liquid crystal display and said two dimensional display device is a cathode ray tube.

21. A three dimensional display apparatus according to claim 20, wherein:

said lens system comprises at least one graded index lens.

22. A three dimensional display apparatus according to claim 21, wherein:
said two dimensional display device comprises a plurality of lossy optical fibers around a portion of the circumference of said graded index lens.

23. A three dimensional display apparatus according to claim 22, wherein:
said at least one graded index lens comprises a plurality of graded index lenses each having a plurality of lossy optical fibers around a portion of their circumferences.

24. A three dimensional display apparatus according to claim 23, wherein:
a first lossy optical fiber located at a first position around a first of said plurality of graded index lenses is coupled to other lossy optical fibers located at corresponding locations around others of said plurality of graded index lenses.

25. A three dimensional display apparatus according to claim 23, further comprising:
an opaque barrier interposed between the rear halves of at least two of said plurality of graded index lenses.

26. A three dimensional display apparatus according to claim 25, further comprising:
a second opaque barrier interposed between at least two of said plurality of lossy optical fibers.

27. A three dimensional display apparatus according to claim 21, wherein:
said spatial light modulator is arranged such that a cross section through said spatial light modulator is substantially circular.

28. A three dimensional display apparatus according to claim 27, further comprising:
a sheet of lenticules interposed between said graded index lens and said spatial light modulator for scattering light in elevation but maintaining light direction in azimuth.

* * * * *